(12) United States Patent
Nguyen et al.

(10) Patent No.: US 8,776,256 B2
(45) Date of Patent: Jul. 8, 2014

(54) SYSTEM AND METHOD FOR CONTROLLING MULTICAST GEOGRAPHIC DISTRIBUTION

(75) Inventors: Han Q. Nguyen, Marlboro, NJ (US); Huajin Jeng, Middletown, NJ (US); Douglas M. Nortz, Red Bank, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 145 days.

(21) Appl. No.: 13/097,458

(22) Filed: Apr. 29, 2011

(65) Prior Publication Data

US 2012/0278898 A1 Nov. 1, 2012

(51) Int. Cl.
*G06F 21/10* (2013.01)

(52) U.S. Cl.
USPC .......................................................... 726/27

(58) Field of Classification Search
CPC ................................................... H04L 49/201
USPC ............................................................ 726/27
See application file for complete search history.

(56) References Cited

U.S. PATENT DOCUMENTS

| | | | |
|---|---|---|---|
| 8,064,449 B2 * | 11/2011 | Fernandez Gutierrez | 370/390 |
| 2002/0007374 A1 * | 1/2002 | Marks et al. | 707/513 |
| 2005/0044142 A1 * | 2/2005 | Garrec et al. | 709/204 |
| 2006/0146857 A1 * | 7/2006 | Naik et al. | 370/432 |
| 2007/0028002 A1 * | 2/2007 | McCanne | 709/238 |
| 2007/0115975 A1 | 5/2007 | Zhang | |
| 2007/0226765 A1 | 9/2007 | Bahnck et al. | |
| 2007/0291944 A1 | 12/2007 | Wingert et al. | |
| 2008/0056219 A1 * | 3/2008 | Venkatachalam | 370/342 |
| 2008/0065783 A1 | 3/2008 | Iloglu et al. | |
| 2008/0066095 A1 | 3/2008 | Reinoso | |
| 2008/0066103 A1 | 3/2008 | Ellis et al. | |
| 2008/0089330 A1 | 4/2008 | Ballantyne | |
| 2008/0151808 A1 * | 6/2008 | O'Neill | 370/312 |
| 2008/0168487 A1 | 7/2008 | Chow et al. | |
| 2008/0175239 A1 * | 7/2008 | Sistanizadeh et al. | 370/390 |
| 2008/0256569 A1 | 10/2008 | Rhoades et al. | |
| 2009/0207840 A1 * | 8/2009 | McCanne | 370/390 |
| 2009/0293090 A1 | 11/2009 | Quigley et al. | |
| 2009/0293095 A1 * | 11/2009 | Karaoguz et al. | 725/119 |
| 2010/0043067 A1 * | 2/2010 | Varadhan et al. | 726/13 |
| 2010/0083301 A1 | 4/2010 | Swenson | |
| 2010/0115544 A1 | 5/2010 | Swenson | |

(Continued)

OTHER PUBLICATIONS

U.S. Appl. No. 12/632,967, filed Dec. 8, 2009.

(Continued)

Primary Examiner — Techane Gergiso
(74) Attorney, Agent, or Firm — Akerman LLP; Michael K. Dixon; Roy P. Zachariah

(57) ABSTRACT

A content distribution network includes first and second controllers, and multicast enabled routers. The first controller is configured to select a multicast channel for distributing content, to determine that the content has a geographic restriction associated with a restricted area in the content distribution network, to link an exclusion policy for the content to the multicast channel while the multicast channel provides the content, and to deny a request for the content from a client system within the restricted area based on the exclusion policy. The second controller is configured to distribute the exclusion policy to the multicast enabled routers including a first router configured to store the exclusion policy, and to ignore a multicast join message from the client system within the restricted area based on the exclusion policy.

19 Claims, 8 Drawing Sheets

(56) References Cited

U.S. PATENT DOCUMENTS

| | | |
|---|---|---|
| 2010/0125866 A1 | 5/2010 | Sofos et al. |
| 2010/0125867 A1 | 5/2010 | Sofos et al. |
| 2010/0138855 A1 | 6/2010 | Sofos et al. |
| 2010/0246467 A1* | 9/2010 | Song et al. ............ 370/312 |
| 2010/0322128 A1* | 12/2010 | Becker et al. ............ 370/312 |
| 2011/0061085 A1* | 3/2011 | Savard et al. ............ 725/110 |
| 2011/0225417 A1* | 9/2011 | Maharajh et al. ............ 713/150 |
| 2011/0302270 A1* | 12/2011 | Kawabe et al. ............ 709/217 |

OTHER PUBLICATIONS

U.S. Appl. No. 12/966,489, filed Dec. 13, 2010.

* cited by examiner

SYSTEM AND METHOD FOR CONTROLLING MULTICAST GEOGRAPHIC DISTRIBUTION

FIELD OF THE DISCLOSURE

The present disclosure generally relates to communications networks, and more particularly relates to content delivery networks.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Figure 1:
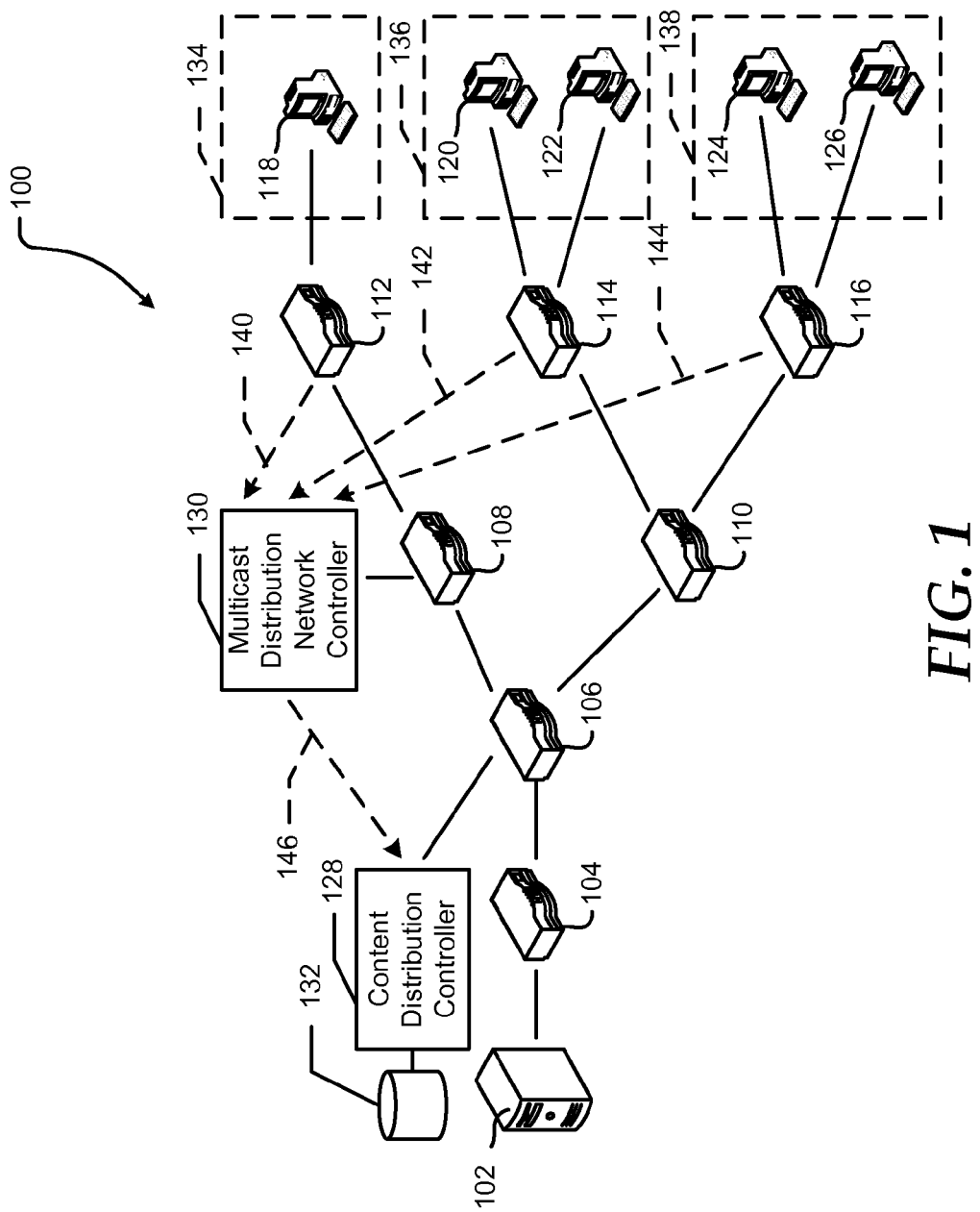
FIGS. 1-5 are diagrams illustrating a content distribution network (CDN) in accordance with one embodiment of the present disclosure.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

FIGS. 1-5 show a geographically dispersed network 100, such as the Internet. Network 100 can include a content server 102 and routers 104, 106, 108, 110, 112, 114, and 116 to provide content to client systems 118, 120, 122, 124, and 126. The geographically dispersed network 100 can also include a content distribution controller (CDC) 128, and a multicast distribution network controller (MDNC) 130. The CDC 128 can include a database/memory 132. The CDC 128 can communicate with the content server 102, and with the MDNC 130, which in turn can communicate with the routers 112, 114, and 116. The communication between the content server 102, routers 104 through 116, client systems 118 through 126, the CDC 128, and the MDNC 130 can be via border gateway protocol (BGP) or any other similar Internet Protocol (IP) communication protocol. The communication between the content server 102, routers 104 through 116, client systems 118 through 126, the CDC 128, and the MDNC 130 can be via border gateway protocol (BGP) or any other similar Internet Protocol (IP) communication protocol. The communication between the content server 102, routers 104 through 116, the CDC 128, and the MDNC 130 can be via border gateway protocol (BGP) or any other similar Internet Protocol (IP) communication protocol. The communication between the content server 102 and client systems 118 through 126 can be via hypertext transfer protocol (HTTP) or any other similar Internet Protocol (IP) communication protocol.

The client system 118 can be located in network destination area 134, client systems 120 and 122 can be located in network destination area 136, and client systems 124 and 126 can be located in network destination area 138. The network destination areas 134, 136, and 138 can either be multicast enabled areas or non multicast enabled areas. Depending on network conditions, the multicast enabled areas can change from being multicast enabled, to not being multicast enabled, and back to being multicast enabled. The routers 112, 114, and 116 can each be an edge router such that the routers can provide communication between the network 100 and the respective network destination areas 134, 136, and 138.

The edge routers 112, 114, and 116 can be aware of a multicast reachability status for each network destination area that the edge router serves, such as whether a specific network destination area is multicast enabled. The edge routers 112, 114, and 116 can also detect if a previously multicast enabled area is disabled for a period of time. In an embodiment, each of the edge routers 112, 114, and 116 may have additional network destination areas (not shown) that the edge router can service, and some of these network destination areas can be multicast enabled while others may not be multicast enabled.

The MDNC 130 can compile a list of IP prefixes associated with the multicast enabled areas based on signals obtained from the edge routers 112, 114, and 116. For example the edge router 112 can detect that the network destination area 134 is multicast enabled, and can send a signal 140 to the MDNC 130 indicating that the network destination area 134 is multicast enabled. The edge router 112 can use a Network Layer Reachability Information (NLRI) field of BGP to identify an IP prefix, such as 10.201.24.0/23, associated with the network destination area 134 that can receive multicast signals. For example the signal 140 can include NLRI {10.201.24.0/23 } to indicate that the network destination area 134 is multicast enabled.

The edge router 114 can detect that the network destination area 136 is multicast enabled, and can send a signal 142 to the MDNC 130 with the NLRI field identifying the IP prefix, such as 24.94.32.0/19, associated with the network destination area 136 as being multicast enabled. The edge router 116 can detect that the network destination area 138 is not multicast enabled, and can send a signal 144 to the MDNC 130 with the NLRI field having a null value. In an embodiment, the edge router 114 may determine that network destination area 136, which was previously multicast enabled, has become disabled from receiving multicast signals, and can send a signal to the MDNC 130 with a Withdrawn Routes (WR) field having the prefix of the network destination address, such as WR{24.94.32.0/19}. The MDNC 130 can then remove the prefix 24.94.32.0/19 associated with the network destination area 136 from the list of multicast enabled areas.

When MDNC 130 has obtained the list of multicast enabled areas from edge routers 112, 114, and 116, the MDNC can store the list of multicast enabled areas within the network 100, and can then send the list of multicast enabled areas to the CDC 128 via signal 146. The NLRI field of the signal 146 can include the IP prefixes associated with the multicast enabled network destination areas 134 and 136, such as NLRI{10.201.24.0/23, 24.94.32.0/19}. The CDC 128 then can store the IP prefixes in the list of multicast enabled areas in memory 132. The CDC 128 can also select a multicast channel for providing multicast distribution of content to the network distribution areas 134, 136, and 138. The multicast channel can include a source IP address (S), and a group IP address (G) for the content.

Figure 2:
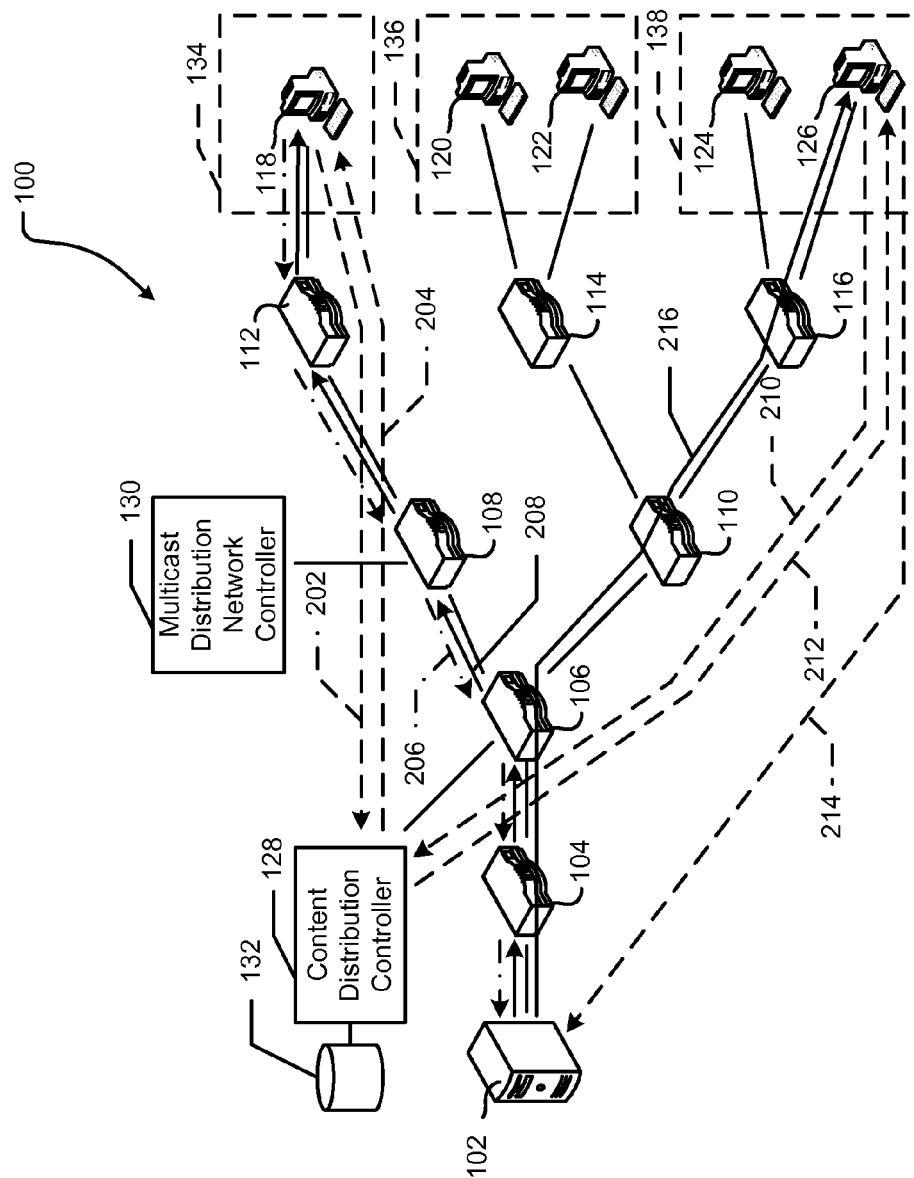

Referring to FIG. 2, client system 118 can send a request 202 for the content to the CDC 128, which in turn can determine whether the client system is in a multicast enabled area by comparing an IP address of the client system to the IP prefixes in the list of multicast enabled areas stored in memory 132. If the IP address of client system 118 matches one of the IP prefixes in the list of multicast enabled areas, the CDC can return the multicast channel (S,G) as the source for the content via signal 204. The client system 118 can then send a multicast join message 206, such as Join(S,G), to the edge router 112, which can forward the multicast join message upstream to the content server 102 through routers 108, 106, and 104 until a replicated multicast copy 208 of the content is found. If the client system 118 is the first client system to send the multicast join message 206, the replicated multicast copy 208 of the content can be sent from the router 104 to the client system via routers 104, 106, 108, and 112. However, if another client system is already receiving the multicast channel, the replicated multicast copy 208 may be sent from router 106 or 108.

The client system 126 can send a request 210 for the content to the CDC 128, which can then determine whether the client system is in a multicast enabled area by comparing an IP address of the client system to the IP prefixes in the list of multicast enabled areas stored in memory 128. The CDC 128 can then determine that the client system 126 is not in a multicast enabled area, and can return a unicast address as a source address for the content to the client system via signal 212. The client system 126 can then send a request 214 for the content to the unicast address, which can be resolved at the content server 102 via routers 116, 110, 106, and 104. The content server 102 can then provide a unicast copy 216 of the content to the client system 126 in response to the request 214.

Figure 3:
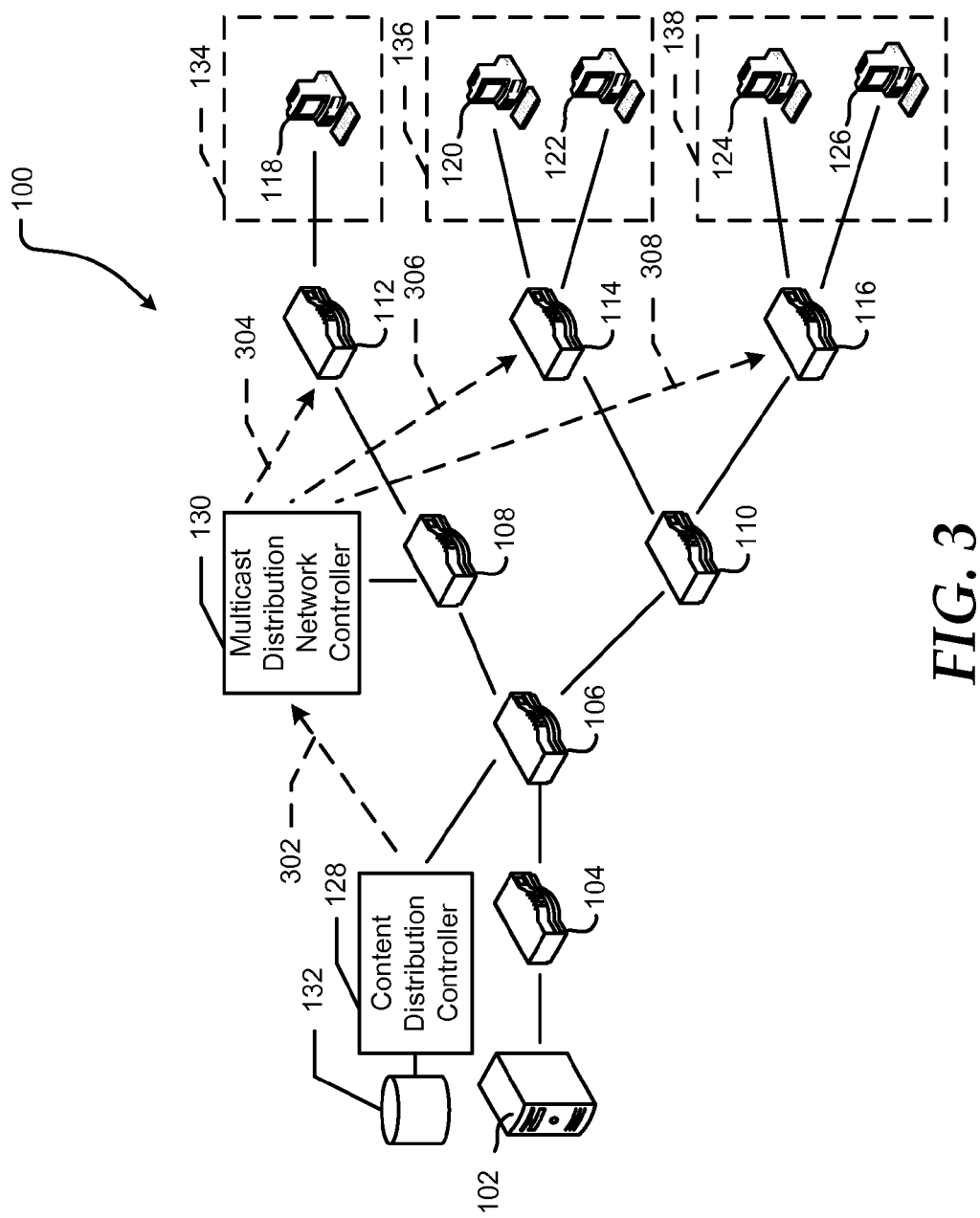

Referring to FIG. 3, after the CDC 128 has received the list of multicast enabled areas and has selected the multicast channel for multicast distribution of specific content, the CDC can determine whether the content has a geographic restriction to exclude providing the content to one of the multicast enabled areas. The geographic restriction can be a blackout area for a sporting event. The CDC 128 can use a BGP Extended Community Value (CV) to identify different access zones in the network 100. The access zones can be geographically based so that the geographic restrictions can be applied by access zone. In an embodiment, each network destination area 134, 136, and 138 can be in a different access zone, can be in the same access zone, or the like.

When the CDC 128 determines that the content has a geographic restriction, such as excluding the content from network distribution area 136, the CDC can link an exclusion policy for the content to the multicast channel. The CDC 128 can then send the exclusion policy to the MDNC 130 via signal 302. In an embodiment, the exclusion policy can include the IP prefix 24.94.32.0/19 associated with network destination area 136 because the network destination area is in a restricted access zone. Thus, client systems 120 and 122 can be restricted from receiving the multicast channel. A NLRI field associated with the CV can be used in the signal 302 to identify the exclusion of the multicast channel (S,G) to the network destination area 136, such as NLRI{(S,G)}:CV{X}. In the signal 302 X can be the identifier of the access-zone defined to encompass network destination area 136, such as 24.94.32.0/19. The MDNC 130 can then distribute the exclusion policy to the edge routers 112, 114, and 116 via respective signals 304, 306, and 308. When the edge router 114 has received the exclusion policy, the edge router can determine that the exclusion policy is associated with network destination area 136, and can store the exclusion policy for enforcement of the geographic restriction.

Figure 4:
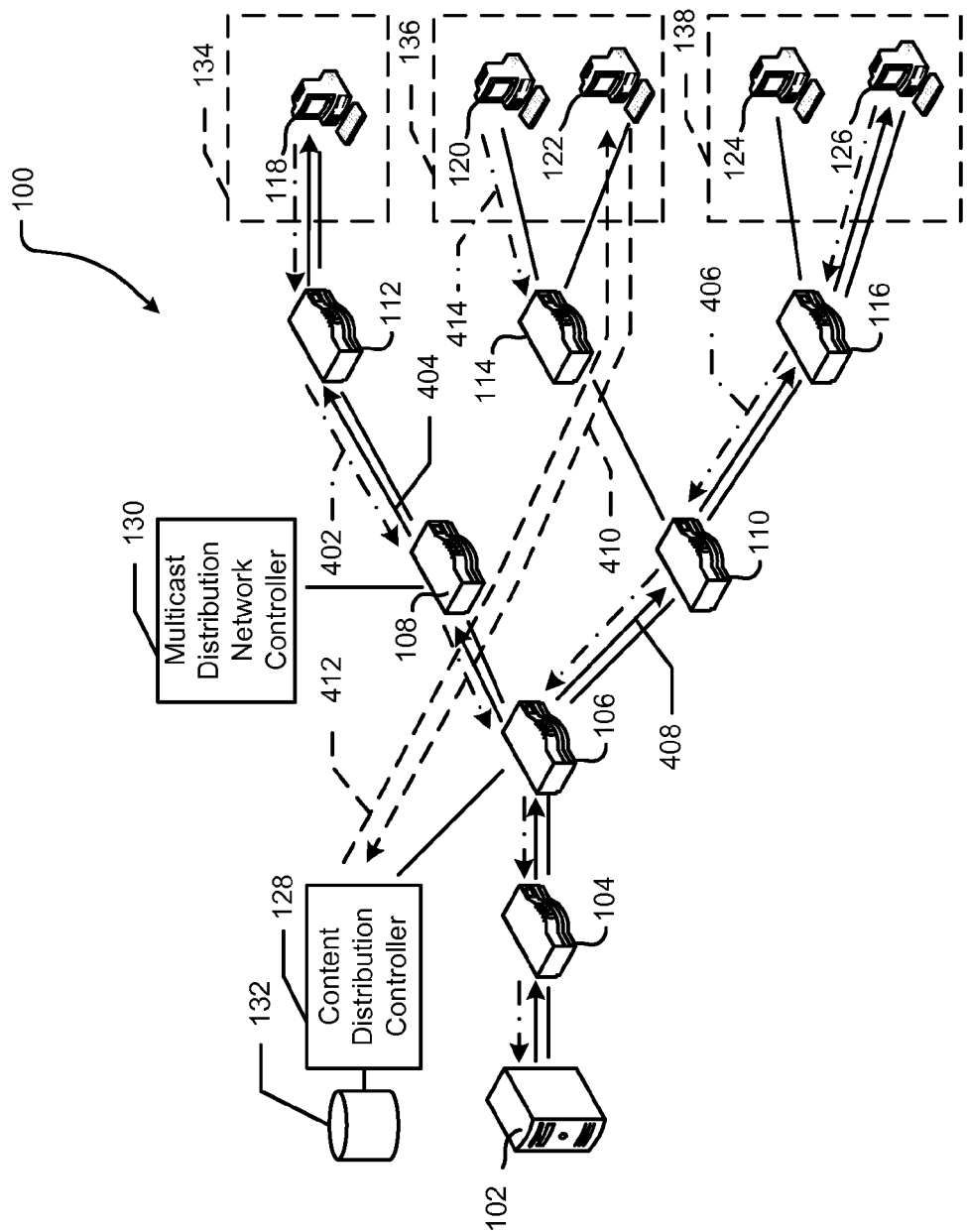

Referring to FIG. 4, client system 118 can request the content from the CDC 128, which in turn can determine that the client system is located in non restricted area 134, and can return the multicast channel as the source address for the content, as discussed above with respect to FIG. 2. The client system 118 can then send a multicast join message 402 to the edge router 112, which can forward the multicast join message upstream to the content server 102 through routers 108, 106, and 104 until a replicated multicast copy 404 of the content is found. The replicated multicast copy 404 of the content can then be sent to the client system 118. Similarly, the client system 126 can receive the multicast channel as the source address for the content. The client system 126 can then send a multicast join message 406 to the edge router 116, which can forward the multicast join message upstream until a node, such as router 106, is found that has a replicated multicast copy 408 of the content. The replicated multicast copy 408 of the content can then be sent to the client system 126.

The client system 122, within restricted area 136, can send a request 410 for a source address of the content to the CDC 128. The CDC 128 can then compare the IP address of the client system 122 to the IP prefix of the exclusion policy. The CDC 128 can deny the request 410 for the content based on the IP address of the client system 122 matching the IP prefix of the exclusion policy, and can send a denial signal 412 to the client system. Thus, the CDC 128 can use the exclusion policy to prevent providing the client system 122 with the geographically restricted content.

The client system 120 can receive the multicast channel source IP address and group IP address without first sending a source request to the CDC 128, and can then send a multicast join message 414, such as Join(S,G), to the edge router 114. However, the edge router 114 can ignore the multicast join message 414 if the IP address of the client system 120 matches the IP prefix of the exclusion policy stored at the edge router. Thus, the distribution of the exclusion policy linked to the multicast channel providing the restricted content can prevent client systems 120 and 122 from receiving the restricted content.

Figure 5:
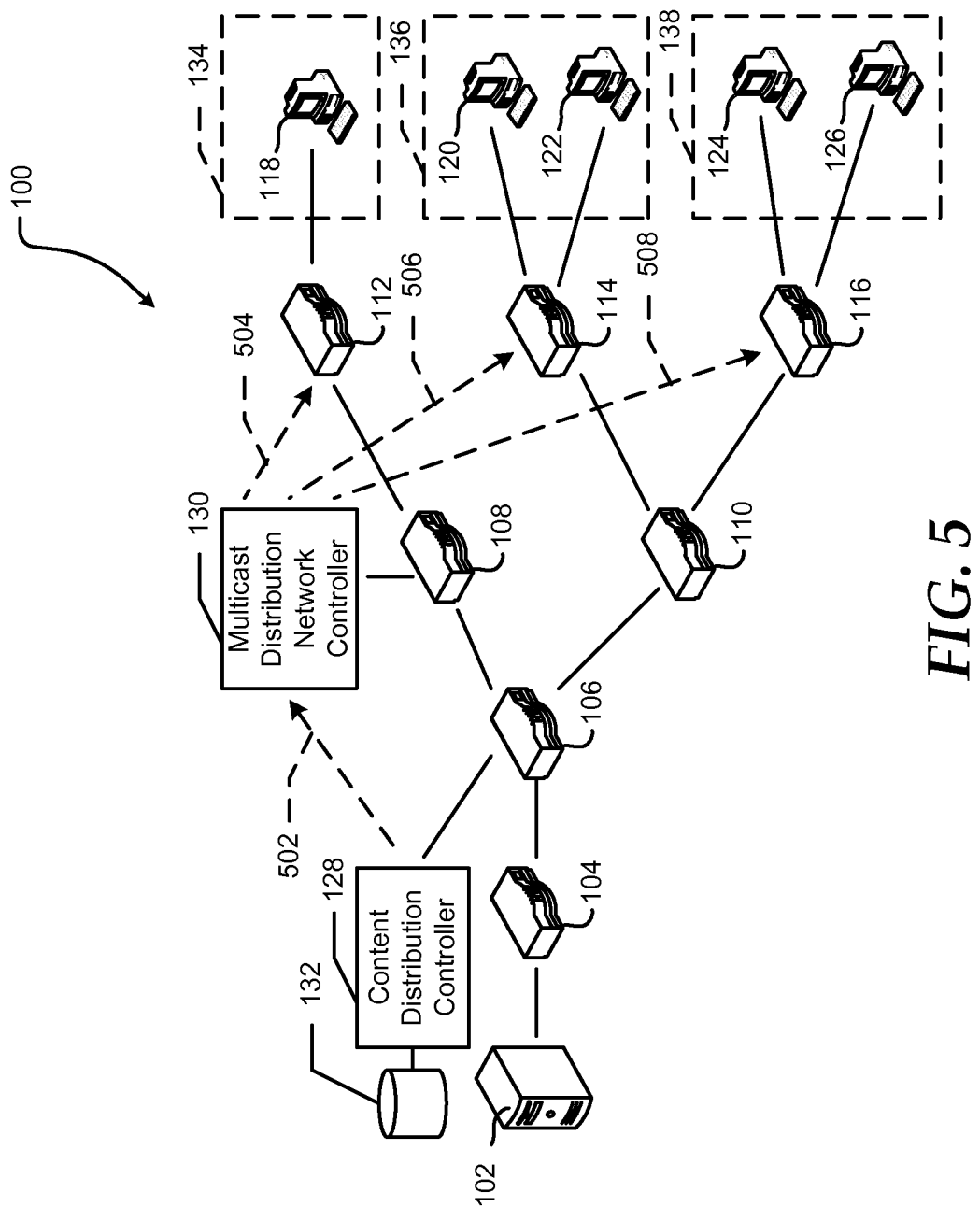

Referring to FIG. 5, the CDC 128 can determine that exclusion policy should be removed for the multicast channel because the geographic restriction on the content has been removed, the multicast channel is no longer used to provide the restricted content, and the like. The CDC 128 can then send a withdrawal signal 502 for the exclusion policy to the MDNC 130. The withdrawal signal 502 can use the CV WR field, such as WR{(S,G)}:CV {X}, to withdraw the exclusion policy from access zone including the network destination area 136. In the withdrawal signal 502 X can be the identifier of the access-zone defined to encompass network destination area 24.94.32.0/19. The MDNC 130 can distribute the withdrawal of the exclusion policy to the edge routers 112, 114, and 116 via respective signals 504, 506, and 508. When the edge router 114 receives the signal 506 indicating the withdrawal of the exclusion policy for network destination area 136, the edge router can remove the exclusion policy from the edge router.

Figure 6:
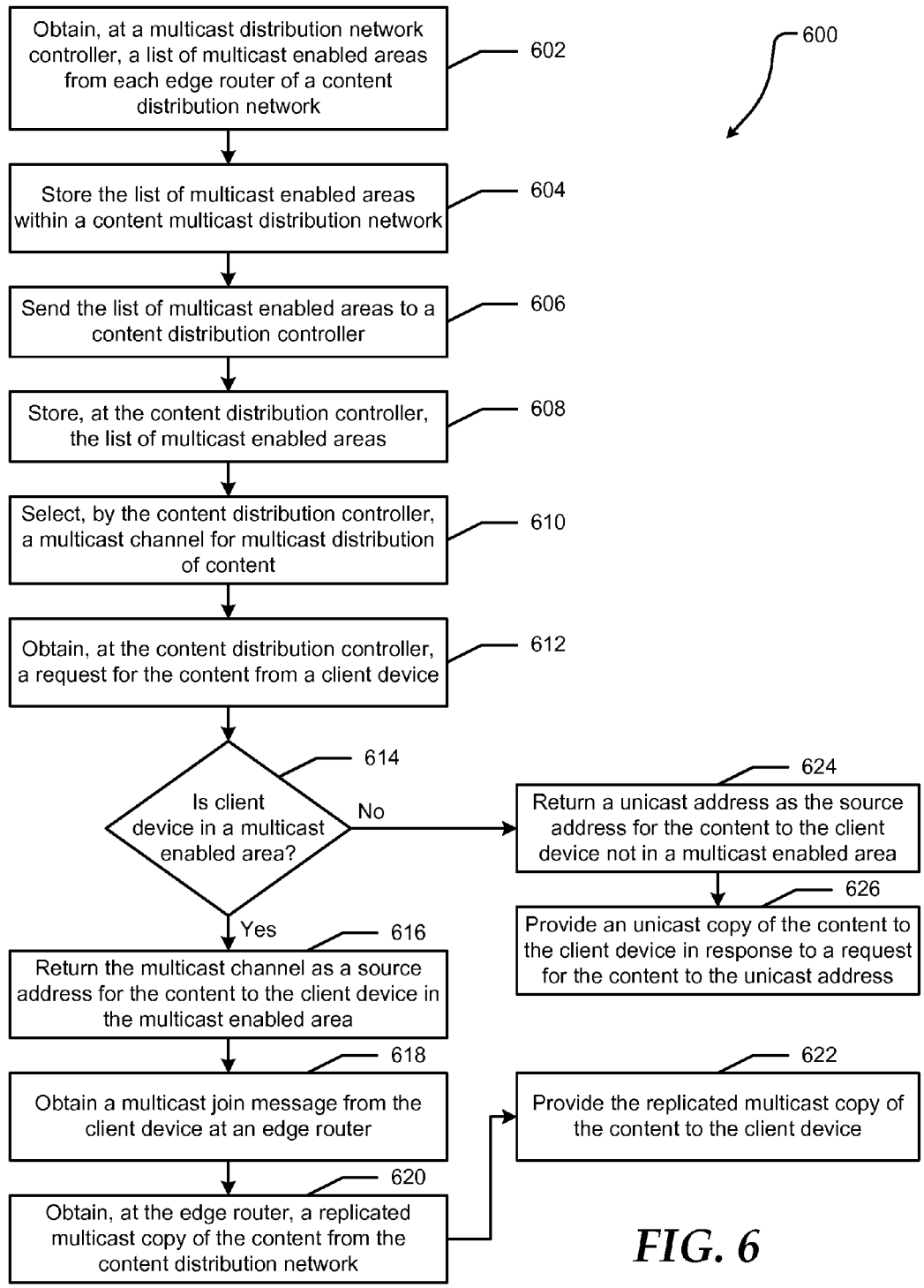
FIG. 6 is a flow diagram illustrating a method for determining network destination areas that are multicast enabled.

FIG. 6 illustrates a method 600 for determining network destination areas that are multicast enabled. At block 602, a multicast distribution network controller (MDNC) obtains a list of multicast enabled areas from each edge router of a content distribution network (CDN). The list of multicast enabled areas can be stored within the Content Multicast Distribution Network at block 604. At block 606, the list of multicast enabled areas is sent to a content distribution controller (CDC) within the CDN. The list of multicast enabled areas is stored in a memory of the CDC at block 608. The list of multicast enabled areas can include IP prefixes associated with each multicast enabled area. A multicast channel is selected by the CDC for distributing specific content at block 610.

At block 612, a request for the content is obtain by the CDC from a client system. At block 614, a determination is made whether the client system requesting the content is in a multicast enabled area. For example the CDC can compare an IP address of the client system to the IP prefixes listed in the list of multicast enabled areas. If the client system is in a multicast enabled area, the multicast channel is returned as a source address for the content to the client system at block 616, otherwise the flow continues at block 624.

At block 618, a multicast join message is obtained at an edge router from the client system. A replicated multicast copy of the content is obtained by the edge router at block 620. The replicated multicast copy can be obtained from a content server and/or another router located in the CDN between the edge router and the content server. At block 622, the replicated multicast copy of the content is provided by the edge router to the client system. If the client system is not in a multicast enabled area, a unicast address is returned as the source address for the content to the client system at block 624. A unicast copy of the content is provided to the client system in response to a request for the content to the unicast address at block 626.

Figure 7:
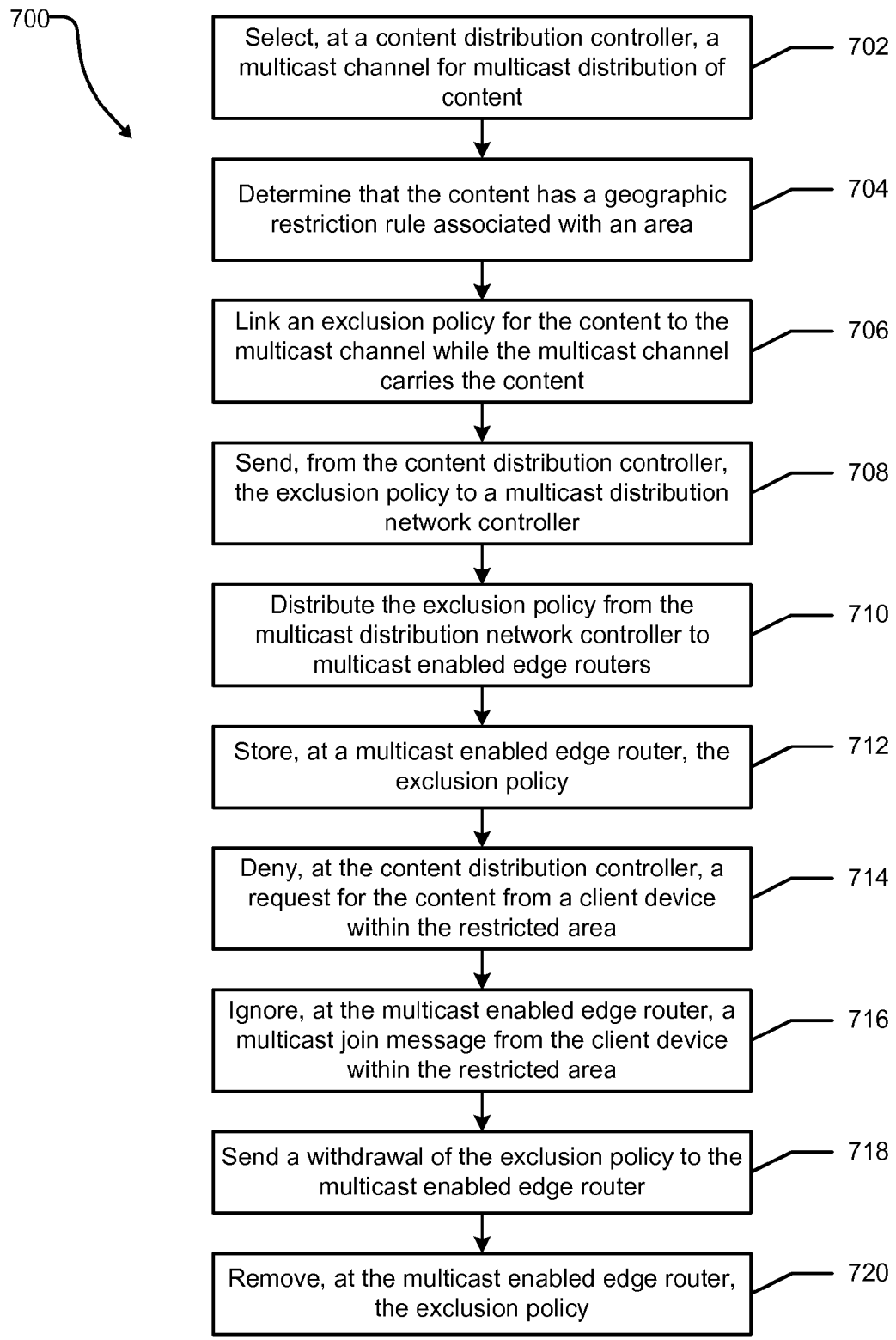
FIG. 7 is a flow diagram illustrating a method for restricting delivery of a multicast signal based on geographical restrictions.

FIG. 7 illustrates a method 700 for restricting delivery of a multicast signal based on geographical restrictions. At block 702, a multicast channel is selected for multicast distributing specific content by a CDC. At block 704, a determination is made that the content has a geographic restriction associated with an area in the CDN. The geographic restriction can be a blackout region for a sporting event. An exclusion policy for the content is linked to the multicast channel while the multicast channel carries the content at block 706. At block 708, the exclusion policy is sent from the CDC to a MDNC. The exclusion policy is distributed from the MDNC to multicast enabled routers at block 710.

At block 712, the exclusion policy is stored at a multicast enabled edge router, which serves the area that is restricted from receiving the content based on the exclusion policy. A request for the content from a client system within the restricted area is denied by the CDC at block 714. For example, if a client system within the restricted area requests a source address for the content, the CDC can deny the request instead of returning the multicast channel as the source address to the client system. At block 716, a multicast join message from the client system within the restricted area is ignored by the multicast enabled edge router. In this situation, the client system in the restricted area could learn the multicast channel without sending a source request to the CDC, but the multicast enabled edge router can ignore the multicast join message based on the exclusion policy being stored in the multicast enabled edge router. At block 718, a withdrawal of the exclusion policy is sent to the multicast enabled edge router. The withdrawal can be based on the multicast channel no longer carry the restricted content, the exclusion of the content being removed for the area, and the like. The exclusion policy is removed from the multicast enabled edge router at block 720.

Figure 8:
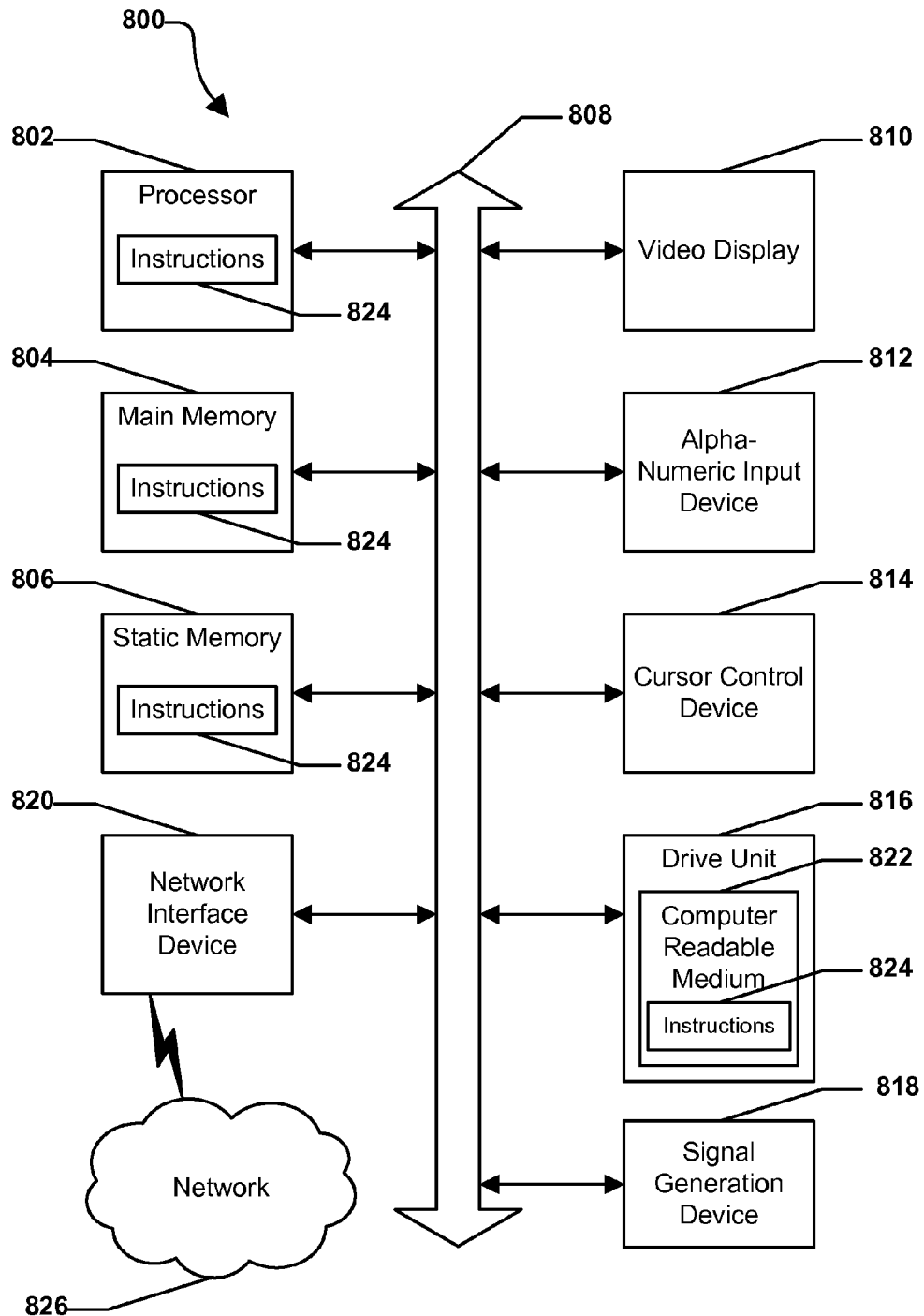
FIG. 8 is an illustrative embodiment of a general computer system.

FIG. 8 shows an illustrative embodiment of a general computer system 800. The computer system 800 can include a set of instructions that can be executed to cause the computer system to perform any one or more of the methods or computer based functions disclosed herein. The computer system 800 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, such as a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810 such as a liquid crystal display (LCD), an organic light emitting diode (OLED), a flat panel display, a solid state display, or a cathode ray tube (CRT). Additionally, the computer system 800 may include an input device 812 such as a keyboard, and a cursor control device 814 such as a mouse. The computer system 800 can also include a disk drive unit 816, a signal generation device 818 such as a speaker or remote control, and a network interface device 820 to communicate with a network 826. In a particular embodiment, the disk drive unit 816 may include a computer-readable medium 822 in which one or more sets of instructions 824, such as software, can be embedded. The computer-readable medium can be a non-transitory computer readable medium, such as a hard disk drive, a flash memory, a read-only memory, a compact disk, a digital versatile disk, a cache, a random-access memory, and the like. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A content distribution network comprising:
   a first hardware controller, comprising:
      a memory that stores instructions; and
      a hardware processor that executes the instructions to perform operations comprising:
         selecting a multicast channel for distributing content;
         identifying an access zone in the content distribution network based on a community value, wherein the access zone applies a geographic restriction associated with a restricted area;
         determining that the content has the geographic restriction associated with the restricted area in the content distribution network;
         linking an exclusion policy for the content to the multicast channel while the multicast channel provides the content; and
         denying a request for the content from a client system within the restricted area based on the exclusion policy; and
   a second hardware controller in communication with the first hardware controller, wherein the second hardware controller distributes the exclusion policy to multicast enabled routers including a first router that stores the exclusion policy, wherein the second hardware controller ignores a multicast join message from the client system within the restricted area based on the exclusion policy, wherein the multicast join message is ignored from the client system if an internet protocol address of the client system matches an internet protocol prefix contained within the exclusion policy.

2. The content distribution network of claim 1, wherein the internet protocol prefix contained within the exclusion policy is associated with the restricted area.

3. The content distribution network of claim 2, wherein the operations further comprise determining that the internet protocol address of the client system matches the internet protocol prefix of the exclusion policy prior to denying the request for the content.

4. The content distribution network of claim 1, wherein the operations further comprise:
   storing a list of multicast enabled areas in a memory;
   obtaining the request for the content from the client system;
   determining whether the client system is in a multicast enabled area; and
   if the client system is in the multicast enabled area, returning the multicast channel a source address for the content to the client system, otherwise returning a unicast address as the source address for the content to the client system and providing a unicast copy of the content to the client system in response to a request for the content to the unicast address.

5. The content distribution network of claim 4, wherein the list of multicast enabled areas includes an internet protocol prefix associated with a multicast enabled area in the list of multicast enabled areas.

6. The content distribution network of claim 5, wherein the operations further comprise comparing the internet protocol address of the client system to the internet protocol prefix listed in the list of multicast enabled areas prior to determining whether the client system is in one of the multicast enabled areas includes.

7. The content distribution network of claim 1, wherein the second hardware controller sends a withdrawal of the exclusion policy to the first router, obtains a list of multicast enabled areas of the content distribution network, stores the list of multicast enabled areas within the content distribution network, and sends the list of multicast enabled areas to the first hardware controller.

8. The content distribution network of claim 1, wherein the first router removes the exclusion policy in response to a withdrawal of the exclusion policy from the second hardware controller, obtains a multicast join message for the multicast channel, obtains a replicated multicast copy of the content, and provides the replicated multicast copy of the content to the client system in response to the multicast join message.

9. A method comprising:

obtaining, at a first controller, a list of multicast enabled areas of a content distribution network;

sending the list of multicast enabled areas to a second controller;

storing the list of multicast enabled areas in a memory of the second controller;

selecting, at the second controller, a multicast channel for distributing content;

identifying an access zone in the content distribution network based on a community value, wherein the access zone applies a geographic restriction associated with a restricted area;

determining that the content has the geographic restriction associated with the restricted area in the content distribution network;

denying a request for the content from a client system within the restricted area based on an exclusion policy and the geographic restriction;

ignoring, based on the exclusion policy, a multicast join message from the client system within the restricted area if an internet protocol address of the client system matches an internet protocol prefix contained within the exclusion policy;

determining, by utilizing instructions from memory that are executed by a processor, whether the client system requesting the content is in a multicast enabled area;

if the client system is in the multicast enabled area, returning the multicast channel as a source address for the content to the client system, otherwise returning a unicast address as the source address for the content to the client system and providing a unicast copy of the content to the client system in response to a request for the content to the unicast address;

providing a replicated multicast copy of the content to the client system in response to the multicast join message if the internet protocol address of the client system does not matches the internet protocol prefix contained within the exclusion policy; and removing the exclusion policy if the geographic restriction of the content has been determined to have been removed.

10. The method of claim 9, further comprising:

obtaining, at an edge router, the multicast join message for the multicast channel; and obtaining, at the edge router, a replicated multicast copy of the content.

11. The method of claim 10, wherein the replicated multicast copy is obtained from a device selected from the group consisting of a content server and a router located in the content distribution network.

12. The method of claim 9, wherein the second controller is a content distribution controller that provides the source address for content in the content distribution network.

13. The method of claim 9, wherein the list of multicast enabled areas includes an internet protocol prefix associated with the multicast enabled area in the list of multicast enabled areas.

14. The method of claim 13, wherein determining whether the client system is in the multicast enabled area includes:

comparing the internet protocol address of the client system to the internet protocol prefix of the multicast enabled area listed in the list of multicast enabled areas.

15. A method comprising:

selecting, by a first controller, a multicast channel for distributing content in a content distribution network;

identifying an access zone in the content distribution network based on a community value, wherein the access zone applies a geographic restriction;

determining, by utilizing instructions from memory that are executed by a processor, that the content has the geographic restriction in the content distribution network;

linking an exclusion policy for the content to the multicast channel while the multicast channel provides the content;

distributing the exclusion policy to multicast enabled routers in the content distribution network;

storing the exclusion policy at one of the multicast enabled routers;

denying, at the first controller, the request for the content from a client system within an area subject to the geographic restriction based on the exclusion policy;

ignoring, at the one of the multicast enabled routers, a multicast join message from the client system based on the exclusion policy, wherein the multicast join message is ignored from the client system if an internet protocol address of the client system matches an internet protocol prefix contained within the exclusion policy; and removing the exclusion policy from one of the multicast enabled routers if the geographic restriction of the content has been determined to have been removed.

16. The method of claim 15, further comprising:

sending a withdrawal of the exclusion policy from the first controller to a second controller;

sending the withdrawal of the exclusion policy from the second controller to the one of the multicast enabled routers.

17. The method of claim 16, wherein the withdrawal is based on the multicast channel no longer carry the restricted content, the exclusion of the content being removed for the area, and any combination thereof.

18. The method of claim 15, wherein internet protocol prefix contained within the exclusion policy is associated with the restricted area.

19. The method of claim 18, wherein denying the request is in response to:

determining that the internet protocol address of the client system matches the internet protocol prefix of the exclusion policy.

* * * * *